Oct. 1, 1946.  J. F. O'BRIEN  2,408,442
ELECTRICITY CONDUCTOR UNIT
Original Filed July 25, 1941  2 Sheets-Sheet 2
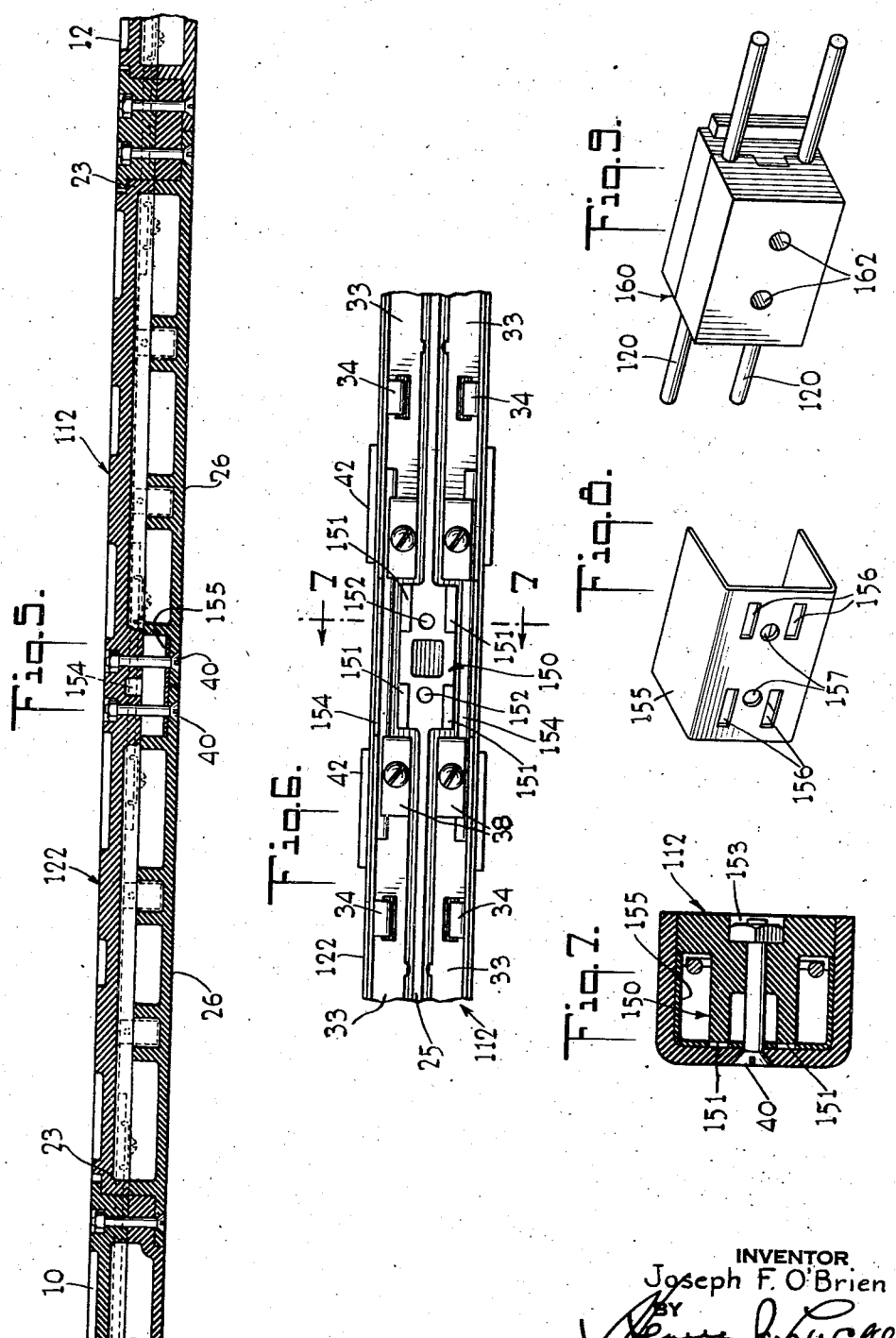
INVENTOR
Joseph F. O'Brien
BY
Henry J. Lucke
HIS ATTORNEY Patented Oct. 1, 1946

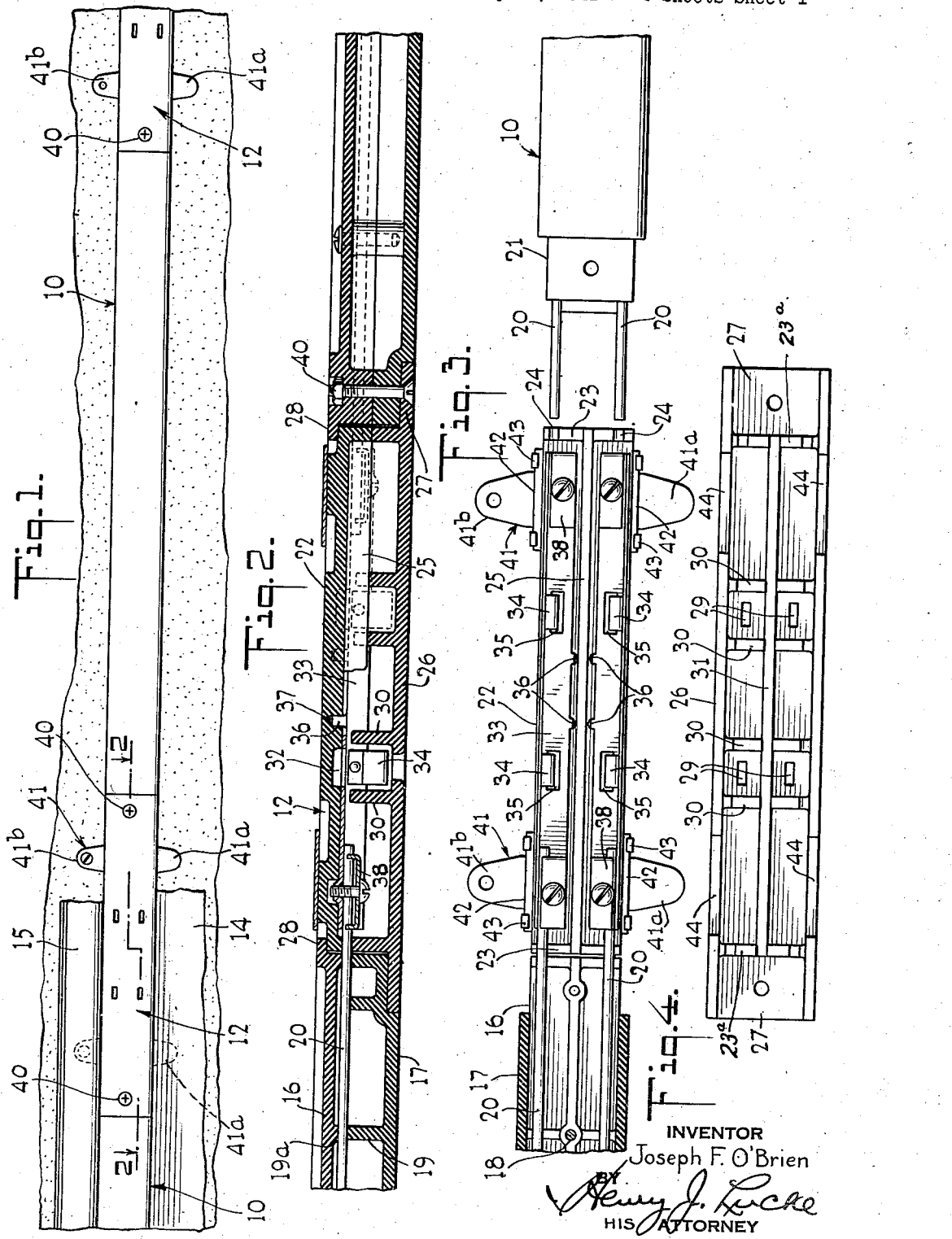

2,408,442

UNITED STATES PATENT OFFICE 2,408,442

ELECTRICITY CONDUCTOR UNIT

Joseph F. O'Brien, Jersey City, N. J., assignor to John B. Pierce Foundation, New York, N. Y., a corporation of New York Original application July 25, 1941, Serial No. 403,978. Divided and this application August 21, 1943, Serial No. 500,051

2 Claims. (Cl. 173—334.1)

This invention relates to electric wiring systems, and particularly to wiring systems embodying seriatim interconnected units adapted for surface installation on a wall or the top of a baseboard or like structural trim.

It is an object of the invention to provide electricity conductor and connector units having improved facilities for the seriatim interconnection thereof.

It is an object of the invention to provide an electric wiring system in which the electrical and mechanical connection of adjacent units may be made from the front of the unit, with means for the complete enclosure of adjacent units over a substantial area beyond the point of interconnection thereof.

It is an object of the invention to provide an electricity connector unit for interconnecting adjacent conductor units, having improved means for securing the conductors therein against accidental displacement during installation and for maintaining the rigidity thereof during use.

This application is a division of my presently copending application Serial No. 403,978, filed July 25, 1941, for Electricity conductor unit, U. S. Patent No. 2,373,331, patented April 10, 1945.

Other features and advantages will hereinafter appear.

In the accompanying drawings:

Fig. 1 is an elevation of a portion of an electric wiring system according to the present invention, run on the baseboard of the wall of a room, said baseboard being shown fragmentarily to reveal the otherwise concealed securement devices;

Fig. 2 is an enlarged section of a portion of the wiring system, looking in the direction of the arrows at 2—2;

Fig. 3 is an enlarged plan view of the portion of the wiring system shown in Figure 2, with the cover member of the left-hand conductor unit removed, and the cover member of the connector unit removed to show the arrangement of the conductors and clamping means therein;

Fig. 4 is a rear view of the cover member of the connector unit of Figure 3;

Fig. 5 is a sectional elevation of a wiring system employing a quadruple outlet unit with which is connected a conductor unit and a single outlet unit;

Fig. 6 is a fragmentary plan view of the base portion of a quadruple outlet unit at the center portion thereof;

Fig. 7 is a section of an assembled quadruple outlet unit taken at 7—7 of Fig. 6;

Fig. 8 is a perspective of an insulating sheath employed in said quadruple outlet unit; and Fig. 9 is a perspective of an interconnector block used to interconnect said quadruple outlet unit and another outlet provided unit.

In Figure 1, the portion of a wiring system shown comprises electricity conductor units 10, 10, and one or more connector units 12, 12. The wiring system is illustratively positioned on the top of a baseboard 14, and may be capped by a conventional molding strip 15. Said molding strip and baseboard are fragmentarily shown.

The conductor unit 10 may have a base 16 and a removable cover 17 secured thereto by machine screws or equivalent 18, see Fig. 3. Cover and base may be molded of electrical insulation material to have any suitable plurality of registering transverse walls 19, 19a each being grooved to engage therebetween and insulatedly support a suitable plurality of electricity conductors 20, 20. It will be noted that the mating walls at each end of each conductor unit 10 define a completely closed end wall, and that each end, 21, of each conductor unit 10 is of reduced dimension to provide a three-sided stepped extension of substantial length, over which an extending end of the cover of the connector unit fits snugly for complete enclosure of such end portion.

The conductors 20 may be tubes or rods of conductive material; manufacturing economies are effected by employing solid conductors, i. e., rods, or lengths of relatively rigid wire. As clearly appears from Figures 2 and 3, said conductors 20 extend for a desirably predetermined distance beyond the ends of the units 10.

The connector unit 12 includes a base 22 of insulation material, having a width equal to the width of the projecting ends 21 of the units 10, and a thickness which desirably positions the inner surface of such base in the same plane as an inner surface of the base 16 of the unit 10. The base 22 has at each of its ends a transverse wall 23, desirably having grooves 24, 24 to receive the conductors 20, and an intermediate longitudinal rib 25 coextensive with the base. The removable cap 26 of the unit 12, also of insulation material, has end portions or eaves 27, 27 which are adapted to envelop the ends 21 of the conductor units 10 about three sides thereof, as previously stated. To complete the enclosure of the conductors at the junctures of units 10 and 12, the base member of unit 10 may have a projecting toe 29, to extend into a suitable pocket formed in the base 22 of the unit 12.

The unit 12 is illustrated as having outlet provisions, pursuant to which the cap member has paired slots 29, 29, desirably bounded by transverse walls 30, 30 and a central wall 31. It will be noted from Figs. 2 and 4 that the transverse walls 30 project beneath the surface of wall 25 and engage the sides thereof, thereby keying the cover 26 positively to the base 22. Disposed beneath said slots when the housing and base of the connector 12 are arranged in ultimate position, said base has pockets 32 to accommodate the ends of the blades of an electric attachment plug.

Referring to Fig. 3, the conductor 33 of the unit 12 is desirably an angle-shaped stamping of copper or brass, on the vertical wall of which may be riveted or welded contacts 34, 34 when the connector unit is provided with electric attachment facilities. Immediately beneath such contacts 34 are openings 35, 35 of suitable width in the plane portion of said angled conductor 33 to permit the passage of the blades of an electrical attachment plug therethrough and into the pocket 32 in the base 22. Desirably intermediate the contacts 34, the base of the conductor 33 may have a plurality, illustratively two, of the downwardly extending lugs 36; said lugs extend into and fit snugly within recesses 37 provided in the base 22, to frictionally secure the conductors 33 on the base member 22 and prevent displacement thereof during installation in a vertical plane.

The grooves 24 in the transverse walls 23 of base 22 and the similar grooves in end walls 23a of cap 26 register with the intersection of the vertical and horizontal walls of the angle-form conductors 33; and the base grooves guide the conductors 20 of an adjacent unit into preferred position for securement to the conductors 33.

Optional means are provided for the mechanical interconnection of adjacent units and for the securement of a run of units to the wall of a room. According to the embodiment of Figures 1 through 3, mechanical interconnection of adjacent units, additional to the connection afforded by the clamping means, is effected by a machine screw and nut 40, which pass through registering openings in the eave 27 of the cap 26 and the extension 21 of a unit 10. The nut of such fastening means is preferably housed within a polygonal pocket in the base member 16 of the unit 10, desirably with a jam fit in such pocket to prevent accidental displacement. The machine screw may, therefore, be inserted and made fast wholly from the front of the unit.

Securement of the run of units to the wall of the room may be accomplished by the mounting clips 41, one or both of the wings of which may be perforated for the passage of a wood screw or like fastening device. Suitably rigid support, however, may be had by inserting the lowermost wing 41a intermediate the baseboard and the wall as shown in Figure 1, and by securing the upper wing 41b to the studding or wall structure by a wood screw. The molding strip 15 fully conceals such upper wing 41b and its screw fastening.

Referring to Figures 3 and 4, it will be noted that the base 22 of connector unit 12 is formed with extending lugs 42, over which fingers 43 of the clips 41 fit in gripping relation therewith. The extent of outward projection of the lugs 42, plus the thickness of the fingers 43, equals the width of the cap member 26, whereupon the unit with its assembled clips 41 is without break or offset which would interfere with the positioning of the unit on the baseboard, or the fit of the molding strip 15 thereon.

The thickness of the lugs 42 is less than the thickness of the base portion, so that a substantial overlap is provided between the side walls of the cap and the upper and lower edges of the base portion. Preferably said cap telescopes over the base portion with a snug fit, thereby minimizing possibility of ingress of dirt or inflow of water into the unit in the areas occupied by the clips 41. It will be understood, see Fig. 4, that the cap member 26 has suitable recesses 44 to accommodate the fingers 43 of the clips.

Where it may not be desirable to employ the clips 41, as where the run of units is exposed on a wall, a wood screw may be substituted for the bolt and nut organization 40.

Figure 5 is a sectional elevation of a portion of a wiring system embodying a unit 10 and a unit 12, interconnected by a quadruple outlet-provided unit 112. In said unit 112, the base 122 corresponds generally to the base 22 of the unit 12 in that it is provided with end walls 23 having groves 24 therein, a central rib 25, lugs 42, and the provisions for the frictional retention of four electricity conductors 33, two disposed at each end of the unit according to the showings of Figure 3.

It will be noted that at the center portion of the base 122, there is provided a structure 150 having vertical side walls provided with upstanding lugs, 151, 151. Such structure 150 has passages 152, 152 therethrough, said passages terminating in polygonal pockets 153 into which the nuts of the screw-nut assemblies 40 snugly and frictionally fit.

Electrical interconnection between conductors 33 of like polarity may be made by the conductors 154, clamped to said conductors in the same manner as are the conductors 20, see Figure 2.

Arranged to fit over and enclose the structure 150 and the electricity conductors 154 on each side thereof, is a sheath 155, which may be of relatively thin insulation material such as molded fiber. Said sheath 155 has openings 156, 156 therethrough, said openings receiving and engaging with the lugs 151 of said structure 150 to accurately position the sheath and prevent lateral displacement thereof. Holes 157 register with the passages 152 of the structure 150.

A pair of standard cover members 26 is used to enclose said base 122, the meeting edge of said covers 26 being at the center of the base 122, and it will be apparent that the sheath 155, fitting beneath the covers, protects the conductors 154 against access from without. Each cover 26 has, at each of its ends, an aperture for the passage of a machine screw 40; said apertures register with the openings 152, 157, whereupon the covers may be securely attached to the base.

In assembling the units on the job, the base 22 of the connector unit 12 or 112 may first be positioned, whereupon a unit 10 may be placed in adjacency thereto, with the extending ends of the conductors 20 thereof guided into position beneath the clamps 38 by the grooves 24. The clamp screws may then be tightened up and after a second run unit 10 has been similarly placed in position, the cover member of the connector unit 12 may be fitted over the assembly and made secure by the screw and nut organization 40 at each end thereof.

It is seen, therefore, that the installation of this wiring system is exceedingly simple, in that all operations of connection, etc., are made from the front and in full view of the installer. The clamping means 38, engaging the conductors 20 at two relatively widely spaced points, and urging said conductors into contact with the conductors 33 at the juncture of the angle-forming walls thereof insure proper electrical interconnection of the respective units.

Whereas I have described my invention by reference to specific forms thereof, it will be understood that many changes and modifications may be made without departing from the spirit of the invention.

I claim:

1. A unit of an electric wiring system of seriatim-interconnected units, comprising a base of electrical insulation material, a central rib integral with said base and extending longitudinally thereof, electricity conductors disposed on said base on each side of said rib, lugs on said conductors extending into said base in frictional engagement therewith to secure said conductors thereto, and a three-sided cover of electrical insulation material adapted to completely enclose said base and said conductors, said cover having eave-like portions extending beyond the ends of said base for the reception of the ends of an adjacent unit of such wiring system.

2. A unit of an electric wiring system of seriatim-interconnected units, comprising a base of electrical insulation material, a central rib integral with said base and extending longitudinally thereof, electricity conductors disposed on said base on each side of said rib, lugs on said conductors extending into said base in frictional engagement therewith to secure said conductors thereto, and a three-sided cover of electrical insulation material adapted to completely enclose said base and said conductors, said cover having eave-like portions extending beyond the ends of said base for the reception of the ends of an adjacent unit of such wiring system, and transverse walls engageable with said central rib in keying relationship therewith to secure said cover in position on said base.

JOSEPH F. O'BRIEN.